United States Patent
Al Sayeed et al.

(10) Patent No.: US 10,868,614 B2
(45) Date of Patent: Dec. 15, 2020

(54) OPTICAL POWER REPLACEMENT FOR FAULTED SPECTRUM IN CHANNEL HOLDER BASED OPTICAL LINKS

(71) Applicant: Ciena Corporation, Hanover, MD (US)

(72) Inventors: Choudhury A. Al Sayeed, Stittsville (CA); David C. Bownass, Ottawa (CA); David W. Boertjes, Nepean (CA); Scott Kohlert, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/120,654

(22) Filed: Sep. 4, 2018

(65) Prior Publication Data
US 2020/0076499 A1 Mar. 5, 2020

(51) Int. Cl.
*H04B 10/03* (2013.01)
*H04B 10/079* (2013.01)
*H04J 14/02* (2006.01)

(52) U.S. Cl.
CPC ........ *H04B 10/0791* (2013.01); *H04J 14/021* (2013.01)

(58) Field of Classification Search
CPC ............ H04B 10/07955; H04B 10/296; H04B 10/03; H04J 14/0221; H04J 14/0201; H04J 14/0212; H04J 14/0209; H04J 14/021; H04J 14/0268; H04J 14/0289; H04J 14/06; H04J 14/02; H04J 14/0276
See application file for complete search history.

(56) References Cited

U.S. PATENT DOCUMENTS

| | | | |
|---|---|---|---|
| 6,031,647 A | 2/2000 | Roberts | |
| 6,061,157 A * | 5/2000 | Terahara | H04J 14/0212 385/15 |
| 6,304,347 B1 | 10/2001 | Beine et al. | |
| 6,522,803 B1 * | 2/2003 | Nakajima | H04Q 11/0005 385/24 |
| 6,959,149 B2 | 10/2005 | Bragg et al. | |
| 7,483,205 B1 | 1/2009 | Lundquist et al. | |
| 8,509,621 B2 | 8/2013 | Boertjes et al. | |
| 8,909,038 B2 | 12/2014 | Cannon et al. | |
| 8,971,705 B2 | 3/2015 | Boertjes et al. | |

(Continued)

FOREIGN PATENT DOCUMENTS

| | | | | |
|---|---|---|---|---|
| EP | 949776 A2 * | 10/1999 | | H04J 14/02 |
| JP | 949776 A2 * | 10/1999 | | H04J 14/02 |

*Primary Examiner* — Tanya T Motsinger
(74) *Attorney, Agent, or Firm* — Clements Bernard Walker; Lawrence A. Baratta, Jr.; Christopher L. Bernard

(57) ABSTRACT

An optical node includes one or more Optical Add/Drop Multiplexer (OADM) devices which each form a respective degree connected to an associated Optical Multiplex Section (OMS) section of a cascaded optical network including a plurality of OMS sections; and a channel holder source connected to the OADM devices, wherein the OADM device is configured to detect a local fault affecting one or more traffic signals and switch to the channel holder source to provide a respective channel holder the one or more traffic signals with a same power level and spectral location such that the respective channel holder replaces a respective traffic signal at the OADM device which is a first switching port after the fault and such that all other OADM devices at other optical nodes downstream from the fault remain switched to the one or more traffic signals due to a presence of the provided respective channel holder.

16 Claims, 11 Drawing Sheets

(56) References Cited

U.S. PATENT DOCUMENTS

| | | |
|---|---|---|
| 9,197,322 B2 | 11/2015 | Boertjes et al. |
| 9,252,913 B2 | 2/2016 | Al Sayeed et al. |
| 9,276,696 B2 | 3/2016 | Al Sayeed et al. |
| 9,344,191 B2 | 5/2016 | Al Sayeed et al. |
| 9,419,708 B2 | 8/2016 | Rad et al. |
| 9,768,899 B2* | 9/2017 | Zhang ............... H04J 14/0205 |
| 9,768,902 B2 | 9/2017 | Al Sayeed et al. |
| 9,906,294 B2 | 2/2018 | Al Sayeed et al. |
| 9,985,726 B1 | 5/2018 | Al Sayeed et al. |
| 2003/0106990 A1* | 6/2003 | Tomofuji ........... H04B 10/2942 250/214 LA |
| 2004/0156095 A1* | 8/2004 | Tsuzaki ............. H04B 10/2916 359/334 |
| 2008/0137179 A1* | 6/2008 | Li ..................... H01S 3/06754 359/337.13 |
| 2008/0285973 A1* | 11/2008 | Uchiyama ........... H04J 14/0212 398/83 |
| 2008/0304829 A1* | 12/2008 | Sato .................... H04J 14/0221 398/79 |
| 2009/0232492 A1* | 9/2009 | Blair .................. H04J 14/0212 398/5 |
| 2009/0238574 A1* | 9/2009 | Sone ................. H04Q 11/0005 398/139 |
| 2011/0311216 A1* | 12/2011 | Inoue ................. H04J 14/0213 398/1 |
| 2012/0243879 A1* | 9/2012 | Nashimoto .......... H04B 10/293 398/140 |
| 2013/0004166 A1* | 1/2013 | Okada ................ H04J 14/0221 398/34 |
| 2014/0286635 A1* | 9/2014 | Kaneko ............... H04B 10/564 398/34 |
| 2015/0132009 A1* | 5/2015 | Yuki ................... H04B 10/296 398/135 |
| 2018/0069648 A1* | 3/2018 | Inada ..................... H04J 14/00 |
| 2020/0076499 A1* | 3/2020 | Al Sayeed ........... H04J 14/021 |

* cited by examiner

FIG. 4

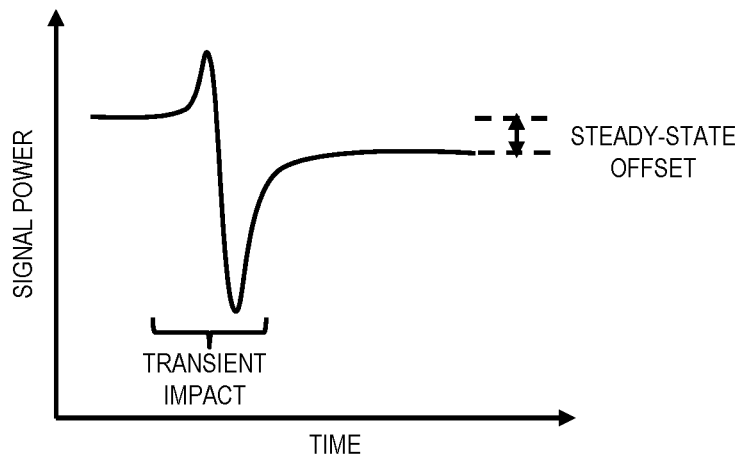

EXAMPLE OF TRANSIENT AND STEADY-STATE IMPACTS ON SURVIVING CHANNELS DUE TO LOSS OF POWER IN AN OMS LINK.
- TRANSIENT IMPACTS ARE PRIMARILY DUE TO SETTLING OF AMPLIFIER CONTROL LOOPS.
- STEADY-STATE OFFSET IS DUE TO SRS, AND OTHER NON-LINEAR IMPACTS IN THE LINK SYSTEM.

FIG. 5

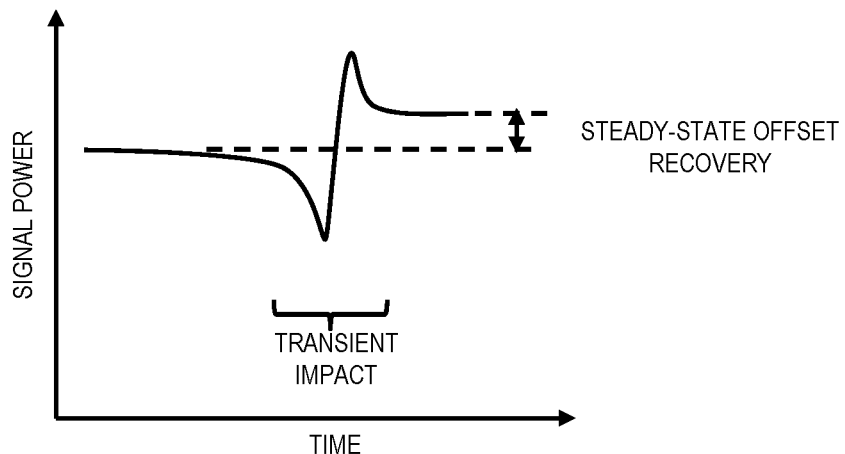

EXAMPLE OF TRANSIENT IMPACTS AND STEADY-STATE OFFSET RECOVERY ON SURVIVING CHANNELS AT THE REPLACEMENT OF LOSS OF POWER IN AN OMS LINK

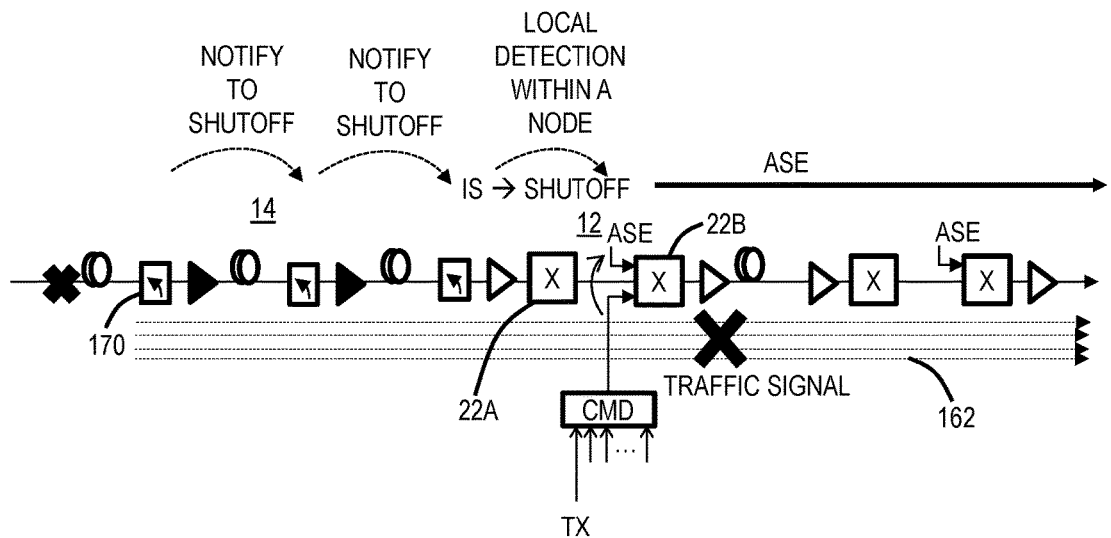

|  | FAILURE | IMPACT |
|---|---|---|
| FAILURE | SHUTOFF DETECTED. EDFA STATE CHANGE FROM IN-SERVICE (IS) TO SHUTOFF IS MADE AVAILABLE AT THE MUX SIDE. THIS IS LOCAL DETECTION WITHIN THE NODE | SWITCH TO ASE FOR ALL CHANNELS COMING FROM THAT SWITCH PORT. |
| AUTOMATIC RECOVERY | SHUTOFF CONDITION CLEARS && VALID AND STABLE POWER REPORTED AT LOCAL SWITCH IN FOR A DURATION (E.G. 10S-20S) | SWITCH BACK TO TRAFFIC PORT. |

☒ WSS 22

▷ PRE/POST AMPLIFIER 24

▶ LINE AMPLIFIER 26

✖ FAULT 40

*FIG. 16*

OPTICAL POWER REPLACEMENT FOR FAULTED SPECTRUM IN CHANNEL HOLDER BASED OPTICAL LINKS

FIELD OF THE DISCLOSURE

The present disclosure generally relates to optical networking. More particularly, the present disclosure relates to systems and methods for optical power replacement for faulted spectrum in channel holder based optical links.

BACKGROUND OF THE DISCLOSURE

Optical networks include nodes interconnected by optical links formed by fiber optic cables including various preamplifiers, post-amplifiers, and optional intermediate line amplifiers. Various power control techniques are utilized to control optical power through the various amplifiers, over the optical links. The loss of a channel or multiple channels can cause optical power transients which can adversely affect remaining, co-routed channels. A technique to deal with the loss of a channel (i.e., Loss of Signal (LOS), Loss of Light (LOL), etc.) involves the use of so-called channel holders. For example, in submarine links which are point-to-point, a multiplexer can switch a channel holder onto a link if there is a local LOS/LOL for any channel, where the channel holder source can be an external component fibered to the multiplexer, or internally integrated with the multiplexer device. Of note, this approach is simplified as a submarine link is point-to-point meaning the link is a single Optical Multiplex Section (OMS) with two terminals interconnected by an optical link which can include various amplifiers. In typical optical networks, the optical connectivity is cascaded, for example, in a mesh configuration or the like. In a mesh optical network, various Optical Add/Drop Multiplexer (OADM) nodes are interconnected to one another. As the cascaded optical network includes various OMS sections, the use of channel holders presents additional complexities relative to the point-to-point case, namely having to traverse multiple OMS sections. That is, for particular channels that traverse multiple OMS sections, adding a channel holder at each OADM switching port over the multiple OMS sections causes significant disruptions.

It would be advantageous to apply channel holders to replace lost channels in a cascaded optical network without the complexity of managing multiple OADM switching points.

BRIEF SUMMARY OF THE DISCLOSURE

In an embodiment, an optical node in a cascaded optical network includes one or more Optical Add/Drop Multiplexer (OADM) devices which each form a respective degree connected to an associated Optical Multiplex Section (OMS) section of the cascaded optical network, wherein the cascaded optical network includes a plurality of OMS sections; and a channel holder source connected to the one or more OADM devices, wherein the OADM device is configured to detect a local fault affecting one or more traffic signals through the OADM device and switch to the channel holder source to provide a respective channel holder for each of the one or more traffic signals that were lost with a same power level and spectral location such that the respective channel holder replaces a respective traffic signal lost at an output of the OADM device which is a first switching port after the fault and such that all other OADM devices at other optical nodes downstream from the fault remain switched to the one or more traffic signals due to a presence of the provided respective channel holder from the channel holder source at the optical node.

The OADM device can be further configured to switch back to the one or more traffic signals responsive to (i) detection the fault has recovered and (ii) measured signal power for the one or more traffic signals is stable over a time period. The OADM device can switch back to the one or more traffic signals over a period of time by switching a fraction of respective spectrum at a time to minimize transients. The OADM device can detect the local fault if (i) a port associated with the one or more traffic signals reports valid power reading and (ii) the port goes from in-service (IS) to a Loss of Signal (LOS) or Loss of Light (LOL). The one or more traffic signals can traverse at least two OMS sections with the OADM device connected to a first OMS section, and wherein a second OMS section does not switch to associated channel holders due to lack of local fiber break detection or due to the respective channel holder presence for each of the one or more traffic signals. The channel holder source can be an Amplified Stimulated Emission (ASE) source.

The local fault can be one of a degree-to-degree fiber cut to the OADM device affecting degree-to-degree connectivity, a transmitter failure, a fiber cut between any of the transmitter, a channel multiplexer connected to the transmitter, and the OADM device connected to the channel multiplexer, an intra-node fiber cut at the optical node, and an upstream fault which has signaling causing optical amplifiers on the associated OMS section to shut down. The local fault can be an upstream fault from the optical node on an associated OMS section, and wherein signaling between optical amplifiers causes the optical amplifiers to shut down within the associated OMS section, leading to the optical node to detect the local fault.

In another embodiment, a method of optical power replacement for faulted channels in a cascaded optical network includes, at an Optical Add/Drop Multiplexer (OADM) device in an optical node, wherein the OADM device forms a degree with is connected to an associated Optical Multiplex Section (OMS) section of the cascaded optical network, locally detecting a fault affecting one or more traffic signals through the OADM device; and switching the one or more traffic signals to associated channel holders to provide a respective channel holder for each of the one or more traffic signals that were lost with a same power level and spectral location such that the respective channel holder replaces a respective traffic signal lost at the OADM device which is a first switching port after the fault and such that all other OADM devices at other optical nodes downstream from the fault remain switched to the one or more traffic signals due to a presence of the provided respective channel holder.

The method can further include switching back to the one or more traffic signals responsive to (i) detecting the fault has recovered and (ii) determining measured signal power for the one or more traffic signals is stable over a time period. The switching back can be over a period of time to minimize transients. The locally detecting the fault can be responsive to (i) a port associated with the one or more traffic signals reporting a valid power reading and (ii) the port going from in-service (IS) to a Loss of Signal (LOS) or Loss of Light (LOL). The one or more traffic signals can traverse at least two OMS sections with the OADM device connected to a first OMS section, and wherein a second OMS section does not switch to associated channel holders due to the respective channel holder for each of the one or more traffic signals. The channel holders can be from an Amplified Stimulated Emission (ASE) source.

The local fault can be one of a degree-to-degree fiber cut to the OADM device affecting degree-to-degree connectivity, a transmitter failure, a fiber cut between any of the transmitter, a channel multiplexer connected to the transmitter, and the OADM device connected to the channel multiplexer, an intra-node fiber cut at the optical node, and an upstream fault which has signaling causing optical amplifiers on the associated OMS section to shut down. The local fault can be an upstream fault from the optical node on an associated OMS section, and wherein signaling between optical amplifiers causes the optical amplifiers to shut down, leading to the OADM device to detect the local fault.

In a further embodiment, a cascaded optical network includes a plurality of optical nodes; and a plurality of Optical Multiplex Section (OMS) sections interconnecting the plurality of optical nodes; wherein a plurality of traffic signals are configured between the optical nodes over various OMS sections, wherein each of the plurality of nodes is configured to detect a local fault affecting one or more traffic signals through an Optical Add/Drop Multiplexer (OADM) device, and switch to a channel holder source to provide a respective channel holder for each of the one or more traffic signals that were lost with a same power level and spectral location such that the respective channel holder replaces a respective traffic signal lost at the OADM device, wherein the OADM device is a first switching port after the fault and all other OADM devices at other optical nodes downstream from the fault remain switched to the one or more traffic signals due to a presence of the provided respective channel holder.

Each of the plurality of nodes can be further configured to switch back to the one or more traffic signals responsive to (i) detection the fault has recovered and (ii) measured signal power for the one or more traffic signals is stable over a time period. Each of the plurality of nodes can detect the local fault if (i) a port associated with the one or more traffic signals reports valid power reading and (ii) the port goes from in-service (IS) to a Loss of Signal (LOS) or Loss of Light (LOL). The local fault can be one of a degree-to-degree fiber cut to the OADM device affecting degree-to-degree connectivity, a transmitter failure, a fiber cut between any of the transmitter, a channel multiplexer connected to the transmitter, and the OADM device connected to the channel multiplexer, an intra-node fiber cut at the optical node, and an upstream fault which has signaling causing optical amplifiers on the associated OMS section to shut down.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a graph of transient and steady-state impacts on surviving channels due to loss of power in an Optical Multiplex Section (OMS) link;

FIG. 5 is a graph of transient impacts and steady-state offset recovery on surviving channels at the replacement of loss of power in an OMS section;

FIG. 16 is a network diagram of a portion of the optical network illustrating an example of the process for handling an upstream fault in an OMS section.

DETAILED DESCRIPTION OF THE DISCLOSURE

In various embodiments, the present disclosure relates to systems and methods for optical power replacement for faulted spectrum in channel holder based optical links. The systems and methods include replacing faulted channels with channel holders (e.g., Amplified Stimulated Emission (ASE) sources or the like) in fault conditions. The systems and methods include detecting a fiber break or channel fault locally ("fault"), and a channel holder is only switched at a first OADM multiplexer point downstream to the fault, while all other OADM multiplexers remain at their traffic signal switch port in order to minimize transient impacts on the surviving channels. Advantageously, the systems and method provide consistent and deterministic behavior for restoring power due to the fault, where only the first OADM multiplexer switches back and forth between the channel holder and traffic, with any downstream OADM multiplexers seeing the presence of the channel holder from the first OADM multiplexer. Advantageously, this can be achieved without end-to-end coordination between OADM multiplexer points based on local detection of the fault and replacement with the channel holder at the first OADM multiplexer downstream from the fault. Specifically, end-to-end coordination per channel path would lead to multiplexer points switching on their own creating multiple transient events on the surviving channel.

The systems and methods can detect a fault based on an intra-node fiber break, where the OADM multiplexer relies on the coordination of state changes on the port associated with the fiber out, combined with valid and stable power reading from the fiber in. Of note, a local port LOS or channel LOS detection does not guarantee presence of fiber breaks. The approach described herein can detect any fault including an OADM demultiplexer to OADM multiplexer fiber cut, or in other words for degree-to-degree connectivity/loss, a transmitter (TX) to a Channel Multiplexer/Demultiplexer (CMD) input fiber cut, an upstream span cut, an intra-node fiber cut on the upstream degree, etc.

Optical Network

Figure 1:
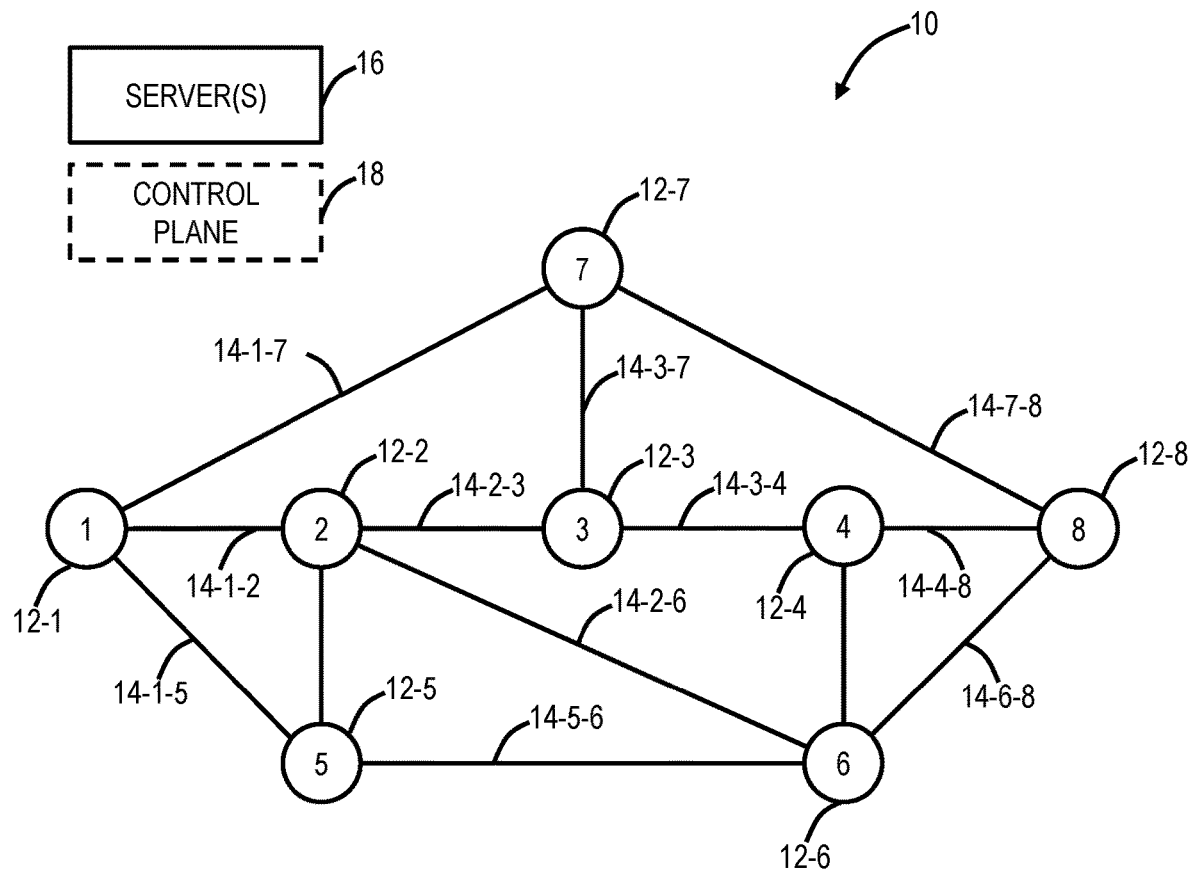
FIG. 1 is a network diagram of an optical network.

FIG. 1 is a network diagram of an optical network 10. The optical network 10 includes nodes 12, labeled as nodes 12-1-12-8, interconnected to one another via links 14 which physically can include one or more optical fibers. The nodes 12 can also be referred to as network elements and can include, without limitation, Wavelength Division Multiplex (WDM) terminals, DWDM terminals, Optical Add/Drop Multiplexers (OADMs), Reconfigurable OADMs (ROADMs), optical cross-connects, optical switches, Packet-Optical Transport Systems (POTS), and the like. In various embodiments, the nodes 12 include various hardware and software to communicate with one another via wavelengths, timeslots, packets, etc. At a physical layer, the nodes 12 provide one or more wavelengths between one another over the links 14. Note, while FIG. 1 shows a single node 12 at each location, there can be multiple devices or network elements providing multiple wavelengths. For illustration purposes, each of the links is labeled as link 14-X-Y where X and Y are the nodes interconnected by the links 14.

The optical network 10 can also include one or more servers 16 and/or a control plane 18. The servers 16 can include or operate as, for example, a Software Defined Networking (SDN) controller, an SDN application, a Network Management System (NMS), an Element Management System (EMS), a planning tool, a Path Computation Element (PCE), etc. The control plane 18 provides an automated allocation of network resources in an end-to-end manner. Examples of control planes may include Automatically Switched Optical Network (ASON) as defined in ITU-T G.8080/Y.1304, Architecture for the automatically switched optical network (ASON) (February 2012), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections. That is, the control plane 18 is configured to establish end-to-end signaled connections to route channels and program the underlying hardware accordingly. SDN provides the management of network services through abstraction of lower-level functionality. This is done by decoupling the system that makes decisions about where traffic is sent (the control plane) from the underlying systems that forward traffic to the selected destination (the data plane).

The optical network 10 has a mesh architecture. Each of the links 14 is an OMS section, and each link 14 can include various amplifiers including pre-amplifiers, post-amplifiers, and intermediate line amplifiers (these are omitted in FIG. 1 for illustration purposes). Of note, the OMS sections can have different fill levels in terms of occupied channels or spectrum. For example, a wavelength #1 can be routed from node 12-1 to node 12-8 via the node 12-7 and a wavelength #2 can be routed from node 12-1 to node 12-3 via the node 12-7. Thus, the wavelengths #1, #2 share the link 14-1-7. As one of ordinary skill can appreciate, various other wavelengths can also be equipped such that the links 14 can have various different fill levels. Further, the wavelengths #1, #2 traverse an intermediate OADM at the node 12-7, thus this is said to be a cascaded optical network as different wavelengths can traverse multiple OMS sections (links 14).

Figure 2:
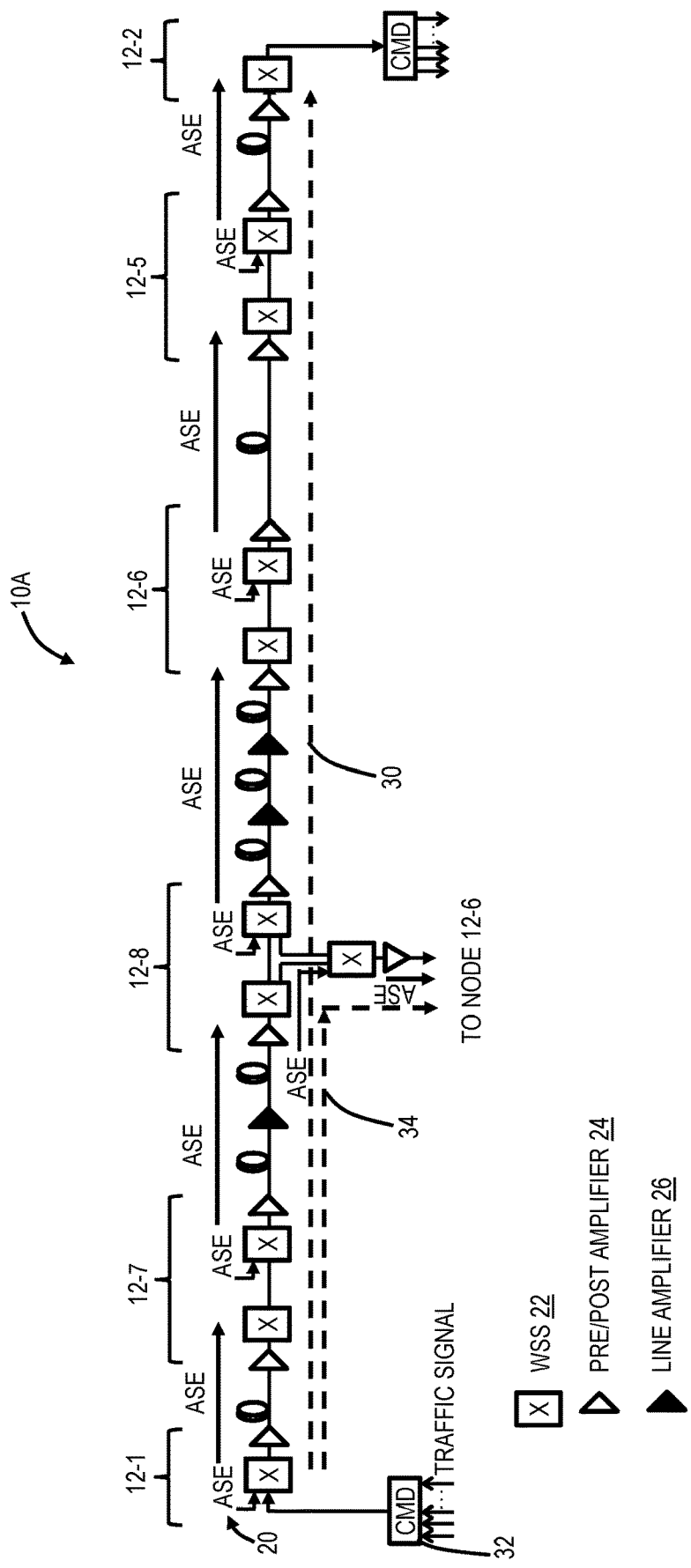
FIG. 2 is a network diagram of a portion of the optical network illustrating additional details for describing the use of channel holders.

FIG. 2 is a network diagram of a portion 10A of the optical network 10 illustrating additional details for describing the use of channel holders 20. For illustration purposes, the portion 10A is shown in a unidirectional configuration from the node 12-1 to the node 12-2 with intermediate nodes 12-7, 12-8, 12-6, 12-5 and a branching degree from the node 12-8 to the node 12-6. Those of ordinary skill in the art will recognize a practical embodiment includes complementary equipment in the opposite direction to form bidirectional connectivity. The nodes 12 include Wavelength Selective Switches (WSS) 22 for each degree, pre/post amplifiers 24, and some of the links 14 include line amplifiers 26. Note, the WSS 22 can generally be defined as an OADM device, namely other degree forming components are also contemplated. For illustration purposes, a traffic signal 30 is shown between the node 12-1 and the node 12-2 and the traffic signal is added/dropped via a multiplexer/demultiplexer 32. Another traffic signal 34 is shown between the node 12-1 and through the node 12-8 to the node 12-6. Note, at the node 12-1, the traffic signals 30, 34 are added together at the multiplexer/demultiplexer 32, but these signals 30, 34 are separated at the node 12-8.

The channel holders 20 can be injected at each WSS 22 in the multiplexer direction to replicate a channel's signal spectral shape, such that unequipped or faulted channels can be present on the links 14 for optical power purposes. In an embodiment, the channel holders 20 can be ASE-based, modulated, unmodulated, etc. An objective is to fill in the spectrum on the links 14 initially so that each OMS section remains full-fill regardless of how many traffic channels are actually equipped. For example, the channel holders 20 can be injected locally to fill empty spectrum space, where there is no traffic signal present. When a traffic signal is provisioned or appears from an upstream node 12, the spectrum space is switched from the channel holder 20 to the traffic switch port to make adequate spectral space for the traffic signal.

With the spectrum at full-fill and the channel holders 20 being launched at the same power level as the traffic signals, the total power within each OMS section 14 remains constant; overcapacity changes that keep Stimulated Raman Scattering (SRS), ripple, tilt, Spectral Hole Burning (SHB) impact on the OMS section 14 the same in the steady-state. The long chain of amplifiers 24, 26 can be either gain controlled or Total Output Power (TOP) controlled in their respective OMS section 14, i.e., on one OMS section 14, all amplifiers can be gain controlled, whereas, in the next OMS section 14, all amplifiers can be TOP controlled.

Channel Holder Problem Definition in a Cascaded Optical Network

Figure 3:
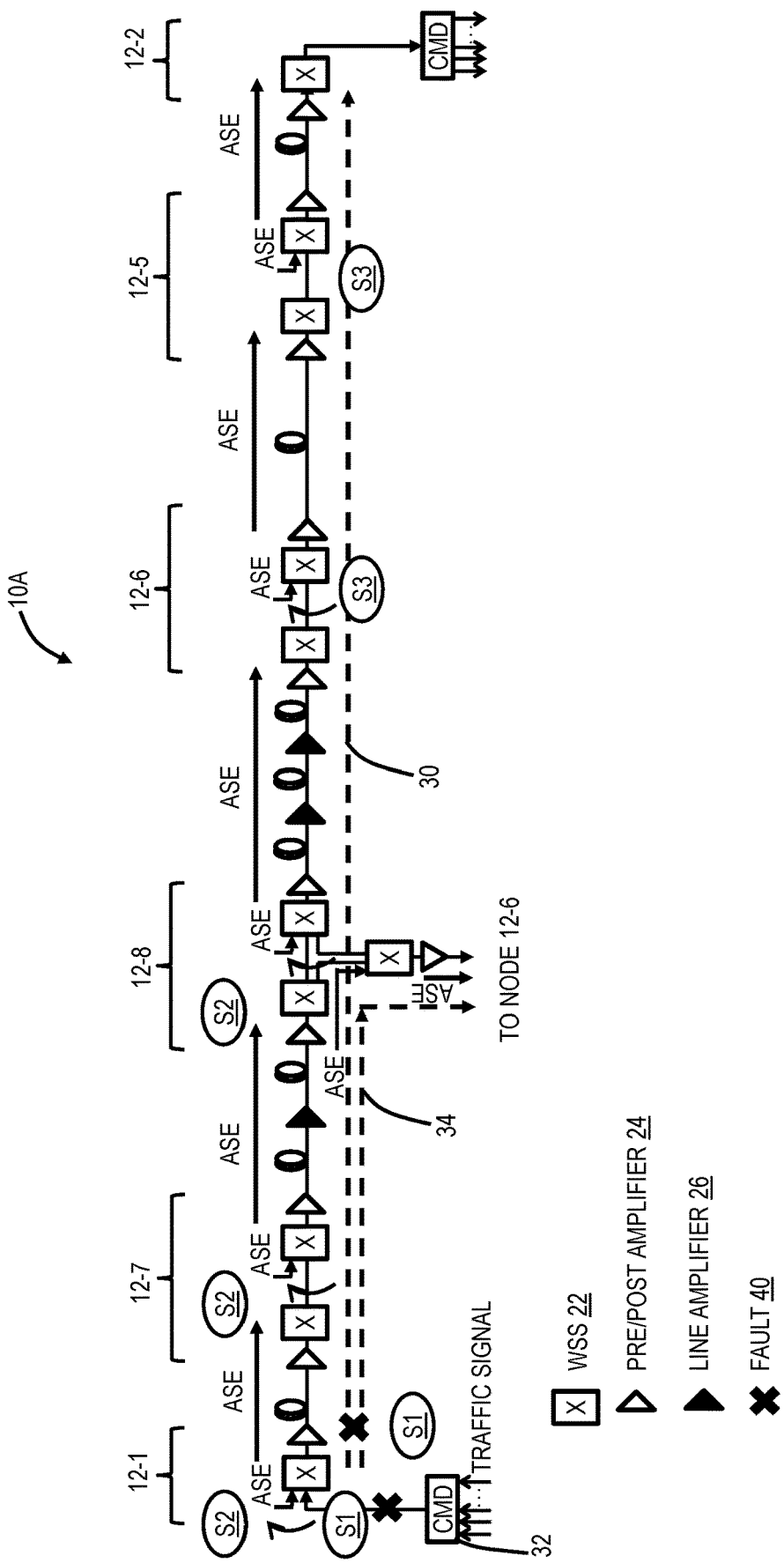
FIG. 3 is a network diagram of the portion of the optical network and associated faults.

FIG. 3 is a network diagram of the portion 10A of the optical network 10 and associated faults 40. When a fiber break or fault 40 takes place, the intention is to replace the faulted spectrum with the channel holders 20 downstream of the fault. This is again to keep the total optical power constant at each OMS section 14 in order to reduce SRS, ripple, tilt and SHB impacts on in-service channels. A TOP controlled OMS section 14 adds an additional challenge where surviving channels jump in launch power to the fiber if the empty spectrum is not replaced with dummy channels (channel holders 20). In FIG. 3, there are channel holders 20 at each node 12 for insertion in the multiplexer direction after the fault 40.

Although the faulted spectrum is replaced with the channel holders 20, several transient events take place during the course of replacement that affect the power and Optical Signal-to-Noise Ratio (OSNR) of the surviving in-service channels. At step S1, the fiber is disconnected or broken between multiplexer/demultiplexer 32 and the WSS 22 multiplexer. The multiplexer/demultiplexer 32 can be either colorless or colored. All locally originated traffic signals from that multiplexer/demultiplexer 32 are detected as faulted (LOS) in all downstream OMS sections 14. This will cause the first set of transient impacts on the surviving channels that are sharing the same downstream path as the faulted channels. That is, surviving channels (due to lack of total power and SRS, ripple, and tilt impacts) will see either overshoots or undershoots in their fiber launch power.

At step S2, if each WSS 22 multiplexer locally detects channel in LOS condition at its own cadence and switches to the channel holder 20 without any synchronization with other WSS's, each time a WSS 22 multiplexer locally switches to its channel holder 20 to replace the faulted spectrum, it will create another set of transient events on the surviving channels, while taking up the steady-state power offsets. In addition, if each WSS 22 multiplexer is detecting the fault recovery by monitoring the power of the lost spectrum coming from upstream, then as soon as an upstream WSS 22 multiplexer switches to the channel holder 20, then the downstream WSS 22 multiplexer assumes the fault 40 is fixed due to optical power availability on the upstream switch port (since it cannot differentiate between channel power and ASE signal powers) and switches back to traffic switch port again. Every time, the WSS 22 multiplexer switches back and forth between the channel holder 20 and traffic switch port, it is expected to create transient events on the surviving channels. This is assuming the channel topology remains unchanged over the fault.

At step S3, it is possible that, due to the presence of residual ASE coming from upstream OMS sections 14, a few downstream WSS 22 multiplexers may not switch locally to the channel holder 20 at all for a fraction of lost spectrum and eventually fills that up with power coming from upstream. This creates inconsistency in the line system where some WSS 22 ports are switched to channel holders 20, and some are not, and makes it difficult for network debugging and if a manual recovery is initiated. Further, this approach leads to multiple switching events causing multiple transients spreading over time.

FIGS. 4 and 5 are graphs illustrating an example of transient and steady-state offset effects. FIG. 4 is a graph of transient and steady-state impacts on surviving channels due to loss of power in an OMS section. FIG. 5 is a graph of transient impacts and steady-state offset recovery on surviving channels at the replacement of loss of power in an OMS section. The transient impacts are primarily incurred due to the settling of amplifier control loops. The steady-state offset is due to SRS, and other non-linear impacts in the link system.

The problem definition in a cascaded optical network can be summarized as, assuming there is no synchronization among WSS 22 multiplexer points to switch back and forth between the channel holder 20 and traffic signals on the fiber fault 40, how to stop back and forth switching among the multiplexer points downstream to the fault 40 that cause multiple transient hits on the surviving channels and how to ensure consistent and deterministic behavior among the multiplexer points downstream to the fault 40?

Optical Power Replacement in a Cascaded Optical Network

Figure 6:
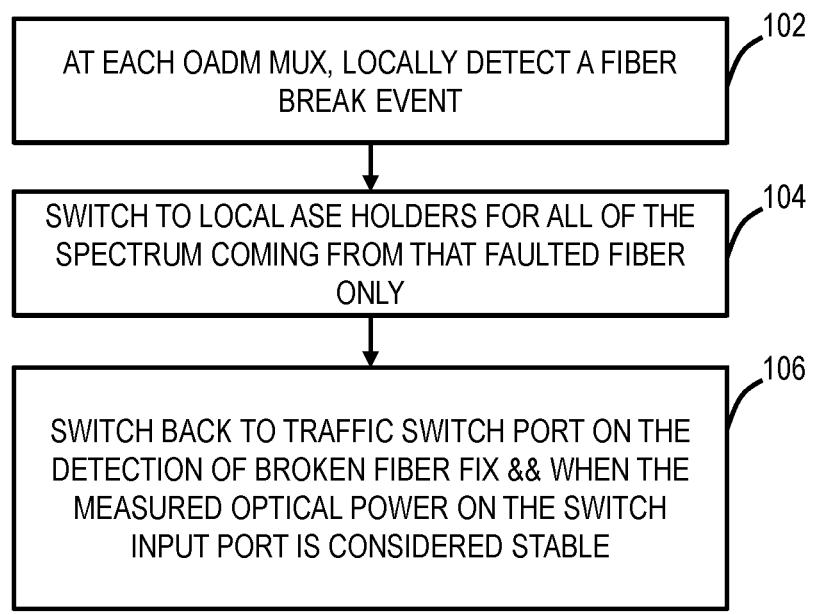
FIG. 6 is a flowchart of a process for optical power replacement in a cascaded optical network.

FIG. 6 is a flowchart of a process 100 for optical power replacement in a cascaded optical network. An objective of the process 100 is to detect the fiber break locally and only switch to the channel holders 20 at the first OADM multiplexer point downstream to the fault, while all other OADM multiplexers remain at their traffic signal switch port. Primarily, the process 100 detects the fiber break event and replaces the missing spectrum power with the channel holders 20 with the same power level and spectral location at the first switching point following the fault (typically at the OADM multiplexer, e.g., a respective WSS 22). The process 100 ensures switching to the local channel holders 20 is performed only when a fiber break is detected and not solely based on Loss of Signal (LOS) detection of channel power or loss of light (LOL) detection on any switch input port only.

The process 100 includes, at each OADM multiplexer, locally detecting a fiber break event (step 102), switching to the local channel holders 20 for all of the spectrum coming from that faulted fiber only (step 104), and switching back to a traffic switch port based on the detection of a broken fiber fix and when the measured optical power on the switch input port is considered stable (step 106).

Figure 7:
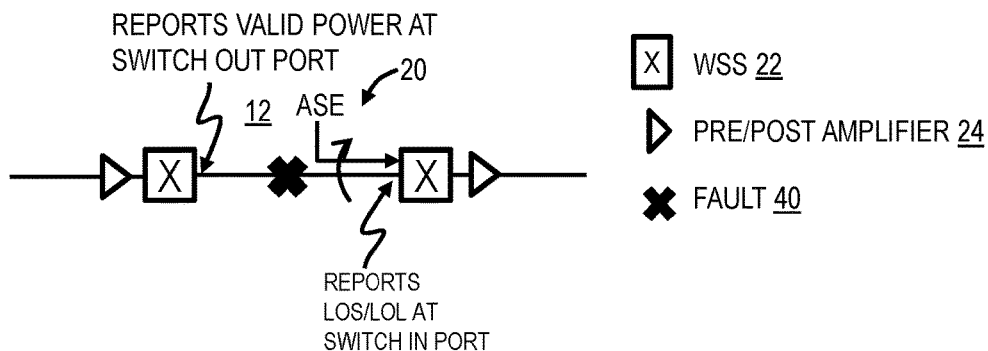
FIG. 7 is a diagram of detection of a fiber break for an intra-node fiber.

FIG. 7 is a diagram of detection of a fiber break for an intra-node fiber. Step 102 of locally detecting a fiber break is detected if (i) the port associated with the input to the fiber reports valid power reading and (ii) the port at the output of the fiber goes from in-service (IS) to LOS/LOL. This locally indicates an intra-node fiber break such that the OADM multiplexer (WSS 22 on the right side) switches to the channel holder 20 at step 104, e.g., an ASE source or the like.

Figure 8:
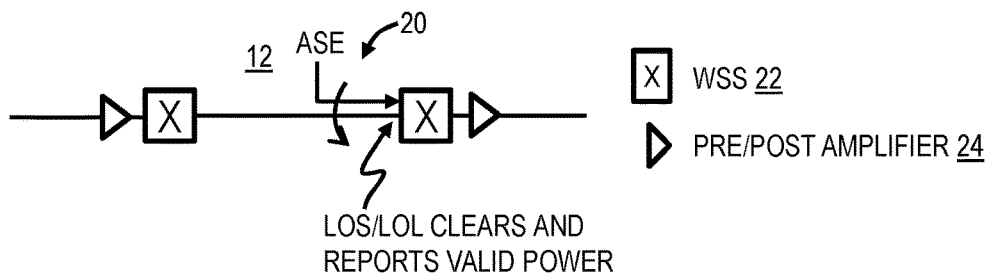
FIG. 8 is a diagram of detection of a fiber break fix for the intra-node fiber.

FIG. 8 is a diagram of detection of a fiber break fix for the intra-node fiber. Step 106 for the detection of a broken fiber fix and when the measured optical power on the switch input port is considered stable is detected if the LOS/LOL condition clears (LOS/LOL→In-service (IS)) from the output fiber port and valid and stable optical power is reported. This locally indicates an intra-node fiber break is fixed and triggers a switch back to traffic at step 106.

The process 100 relies on state change notifications from the fiber out ports (IS→LOS/LOL or LOS/LOL→IS), combined with valid and stable power reading (e.g., if the total power on the port >−20 dBm for 20 s) to detect fiber break and fix events. These dual conditions only create one-time transient events on surviving channels for a fiber fault and for optical power recovery at the first OADM multiplexer points by replacing with the channel holder 20.

When the fault recovers and the channel holder 20 is switched off, and the recovered fiber is switched back to the traffic signal port, the transient impact can be minimized by throttling the total amount of spectrum switches from the channel holder 20 to the traffic (e.g., only a fraction of the total spectrum can be switched at a time to minimize transients).

With the process 100 in place, the recovery from the channel holder 20 to the traffic is automatic. The local multiplexer detects the fiber break fix and switches back to traffic. There is no need, in this case, to notify any other nodes downstream. Without the process 100, if all other downstream multiplexer points switch to associated channel holders 20, manual or external coordination and sequencing would be required for all multiplexer switching points to switch them back to traffic in order to reduce transient impacts.

Of note, the process 100 prevents multiple back and forth switches in downstream OADM multiplexer points to reduce transient impact on in-service channels, as well as, bring a consistent deterministic behavior for fault recovery without any end-to-end coordination between OADM multiplexer points, where only the first OADM multiplexer, downstream to the fault, switches between the channel holder 20 and traffic.

Fiber Break Examples

Figure 9:
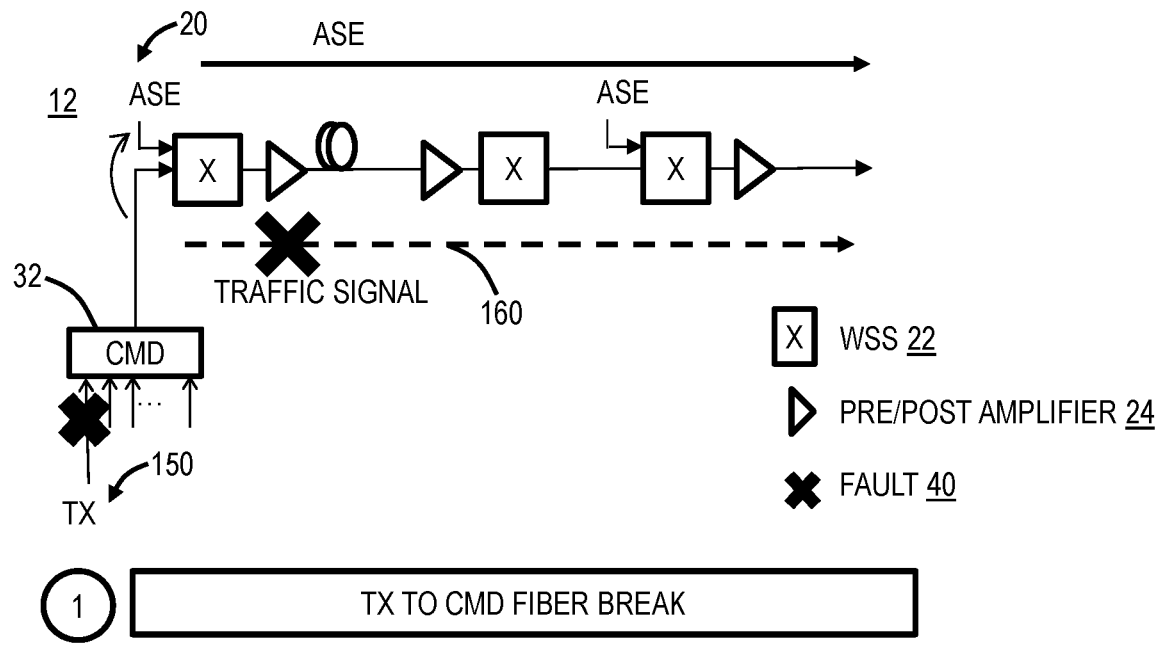
FIG. 9 is a diagram of the optical node illustrating a fiber break due to a faulted transmitter connected to a Channel Multiplexer/Demultiplexer (CMD)

FIGS. 9-14 are various diagrams of the optical node 12 illustrating examples of fiber break detection, where originated channel spectrum is replaced with the channel holders 20 only at the first OADM multiplexer location, which is the optical node 12. FIG. 9 is a diagram of the optical node 12 illustrating a fiber break due to a faulted transmitter connected to a Channel Multiplexer/Demultiplexer (CMD) 32. Here, a single transmitter 150 is faulted (e.g., hardware failure, fiber break from the transmitter 150 to the CMD 32, disconnected optical cable, etc.) causing a single traffic signal 160 to fail. The WSS 22 detects the fault based on a LOS/LOL for the channel associated with the transmitter 150 and switches the channel to the channel holder(s) 20. The scenario illustrated in FIG. 9 is a single channel failure and the channel holder(s) 20 can be configured to only replace the power and spectrum of the single channel, based on the configuration of the WSS 22.

Figure 10:
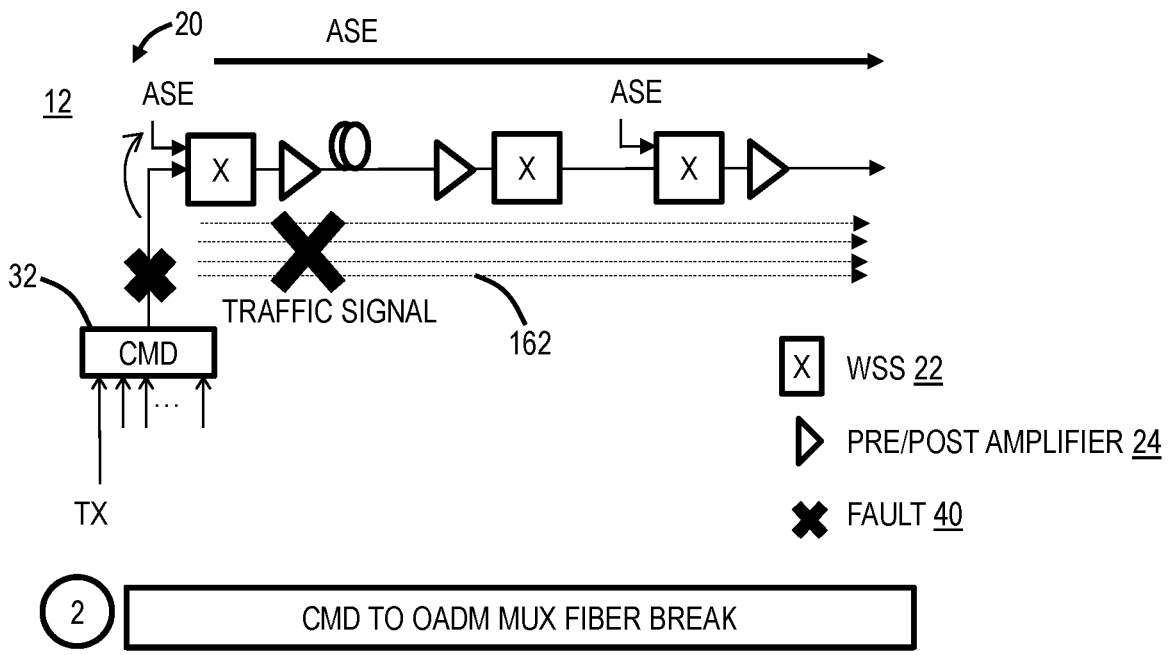
FIG. 10 is a diagram of the optical node illustrating a fiber break between the CMD and a Wavelength Selective Switch (WSS)

FIG. 10 is a diagram of the optical node 12 illustrating a fiber break between the CMD 32 and the WSS 22. Here, the connection between the CMD 32 and the WSS 22 is lost (e.g., fiber break, disconnected optical cable, CMD 32 failure, etc.) causing one or more traffic signals 162 to fail. The WSS 22 detects the fault based on a LOS/LOL for all of the traffic signals 162 from the CMD 32 and switches all of the traffic signals 162 to the channel holder(s) 20. The scenario illustrated in FIG. 10 is a fault of one or more channel failures and the channel holder(s) 20 can be configured to replace the power and spectrum of the traffic signals 162, based on the configuration of the WSS 22.

Figure 11:
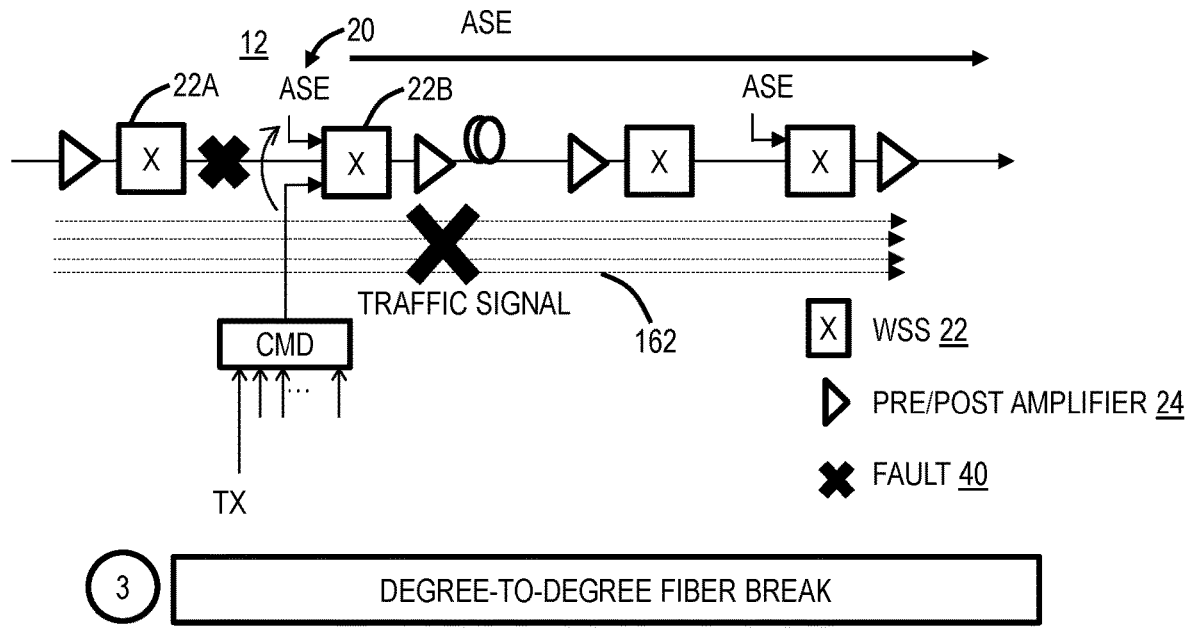
FIG. 11 is a diagram of the optical node illustrating a fiber break between different degrees, i.e., between a left-side WSS and a right-side WSS.

FIG. 11 is a diagram of the optical node 12 illustrating a fiber break between different degrees, i.e., between a left-side WSS 22A and a right-side WSS 22B. Here, the degree-to-degree connection between the left-side WSS 22A and the right-side WSS 22B is lost (e.g., fiber break, disconnected optical cable, WSS 22 failure, etc.) causing one or more traffic signals 162 to fail. The WSS 22B detects the fault based on a LOS/LOL for all of the traffic signals 162 from the left-side WSS 22A to the right-side WSS 22B and switches all of the traffic signals 162 to the channel holder 20. The scenario illustrated in FIG. 11 is one or more channel failures and the channel holder 20 can be configured to replace the power and spectrum of the traffic signals 162, based on the configuration of the right-side WSS 22B.

Figure 12:
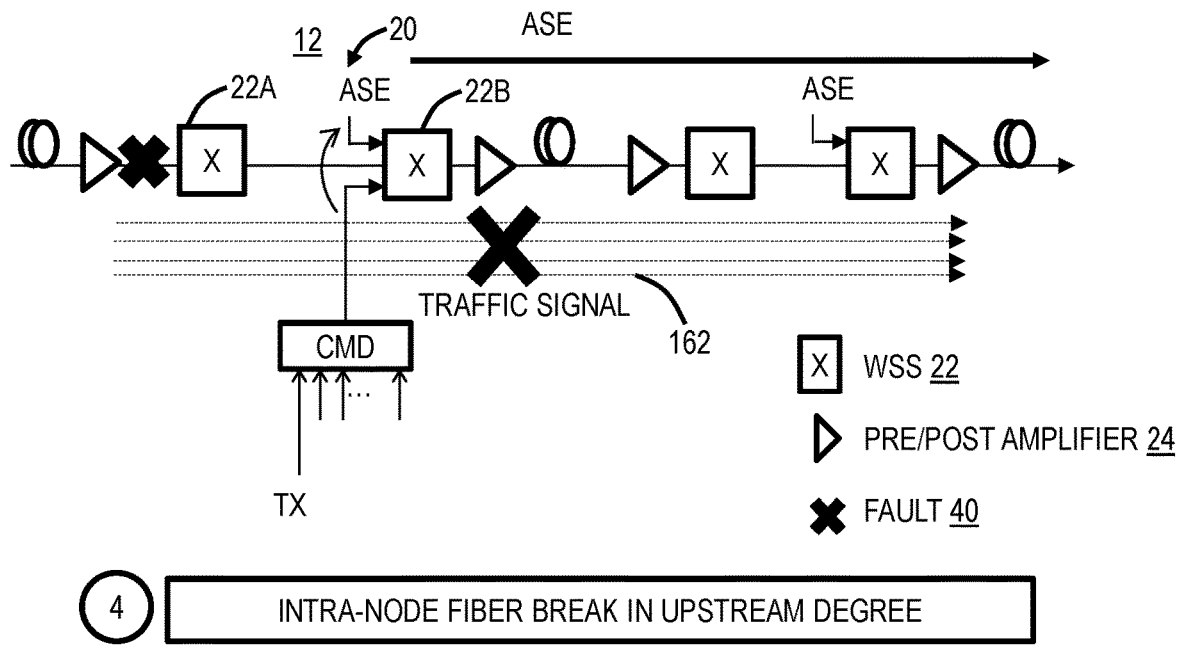
FIG. 12 is a diagram of the optical node illustrating a fiber break in an upstream degree.

FIG. 12 is a diagram of the optical node 12 illustrating a fiber break in an upstream degree. Here, the fault 40 is upstream to the optical node 12, such as a fault input into the left-side WSS 22A, a failure of the pre-amplifier 24 associated with the left-side WSS 22A, etc. The one or more traffic signals 162 from the left-side WSS 22A to the right-side WSS 22B are lost and detected based on a LOS/LOL for all of the traffic signals 162, and the right-side WSS 22B switches all of the traffic signals 162 to the channel holder(s) 20. The scenario illustrated in FIG. 12 is one or more channel failures and the channel holder(s) 20 can be configured to replace the power and spectrum of the traffic signals 162, based on the configuration of the right-side WSS 22B.

Figure 13:
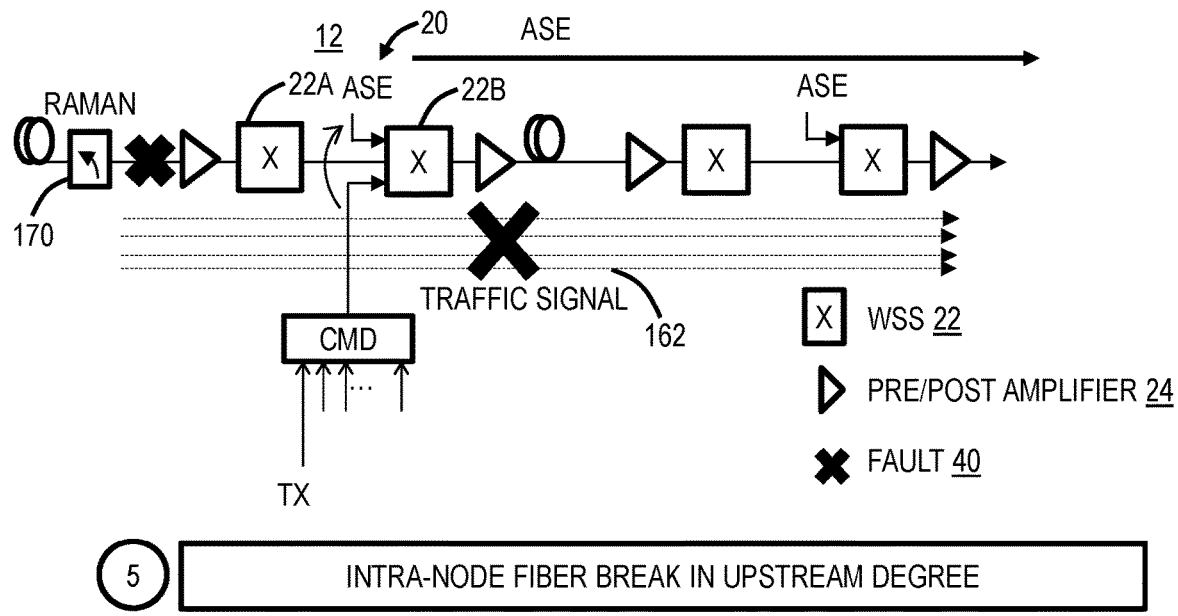
FIG. 13 is a diagram of the optical node illustrating a fiber break in an upstream degree, such as a fault between a Raman amplifier and the left-side WSS.
Figure 14:
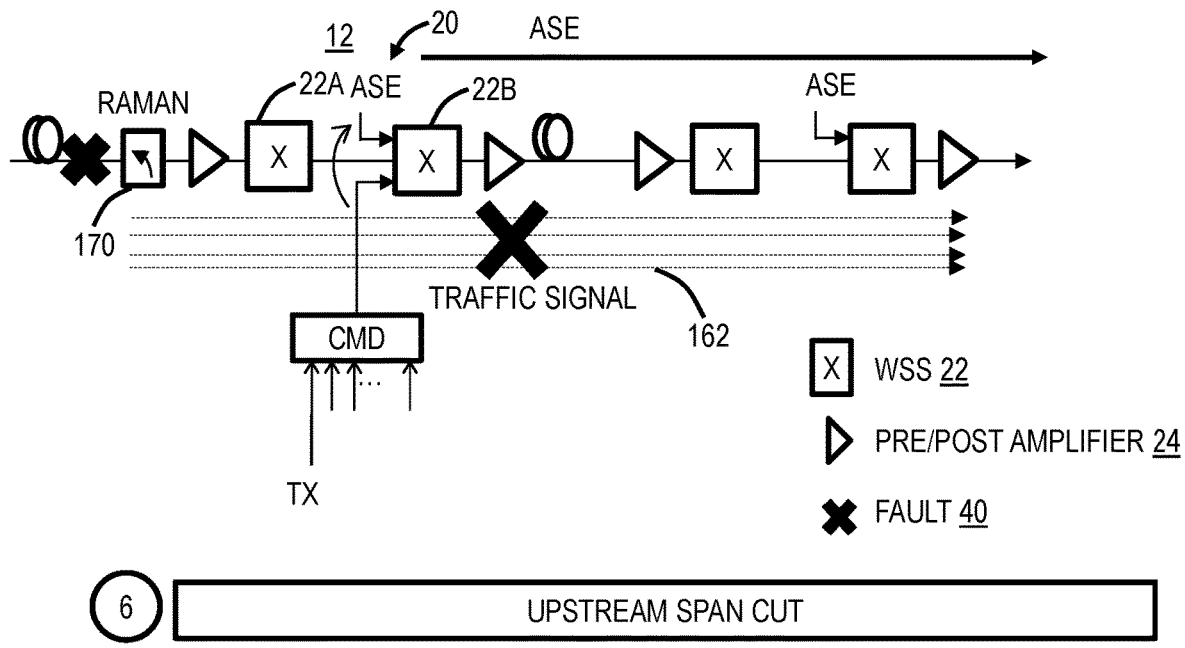
FIG. 14 is a diagram of the optical node illustrating a fiber break in an upstream degree, such as a fault prior to the Raman amplifier.

FIG. 13 is a diagram of the optical node 12 illustrating a fiber break in an upstream degree, such as a fault between a Raman amplifier 170 and the left-side WSS 22A. FIG. 14 is a diagram of the optical node 12 illustrating a fiber break in an upstream degree, such as a fault prior to the Raman amplifier 170. Of note, the embodiments in FIGS. 9-13 are all so-called local faults where the traffic signals 160, 162 are interrupted at the optical node 12. The detection of this fault 40 is at the right-side WSS 22B. That is, the process 100 is implemented, in the embodiments of FIGS. 9-13, at the right-side WSS 22B. The detection of the fault 40 is as described in step 102 and FIG. 7, namely valid optical power readings followed by the traffic signals 160, 162 switching from IS to LOS or LOL.

Upstream Fault

The embodiment in FIG. 14 is a so-called upstream fault which is upstream, e.g., outside of the optical node 12 such as to the left of the Raman amplifier 170 (or a pre-amplifier 24 is the Raman amplifier 170 is omitted). The upstream fault requires additional signaling since the objective is to switch to the channel holder 20 only at the first multiplexer location following the fault 40 and to prevent switching in all downstream multiplexer points. This is also to maintain consistency in all other fault handling cases.

Note, in the embodiment of FIG. 14, the fault 40 is not local to the optical node 12, but upstream on the OMS between the optical node 12 and a corresponding optical node. For example, the fault 40 in the embodiment of FIG. 14 can be anywhere in the OMS outside of the optical node 12, such as at a line amplifier 26, at a post-amplifier 24 at the corresponding optical node, a fiber cut or break anywhere in the OMS, etc. The embodiment of FIG. 14 is referred to as an upstream fault which is not local to the optical node 12.

In the case of the upstream fault as in FIG. 14, it is not possible to use LOS/LOL detection at fiber switch out location, since both switch out and switch in of an inter-degree fiber will experience the LOS/LOL condition. This may also take place in all the downstream intra-degree fibers if the same spectral loading is carried forward.

Note, if it is desired to switch in all downstream multiplexer points consistently based on LOS/LOL detection only, this is not possible due to residual upstream ASE in few cases that may prevent the downstream port from detecting the LOS/LOL. Hence, it is possible for some multiplexers switch to the channel holders 20 while some do not, especially, in a Raman-EDFA (Erbium Doped Fiber Amplifier) system. On a fiber cut, only the Raman-EDFA devices on that span shutoff. However, the Raman amplifiers on other spans remain on and generate enough ASE to keep the EDFAs on in other spans downstream of the fault. This residual ASE will keep the pre-amplifier 24 on and hence, the downstream inter-degree switch ports on, and will not allow downstream multiplexer to switch to the channel holder 20 for an upstream span cut.

Figure 15:
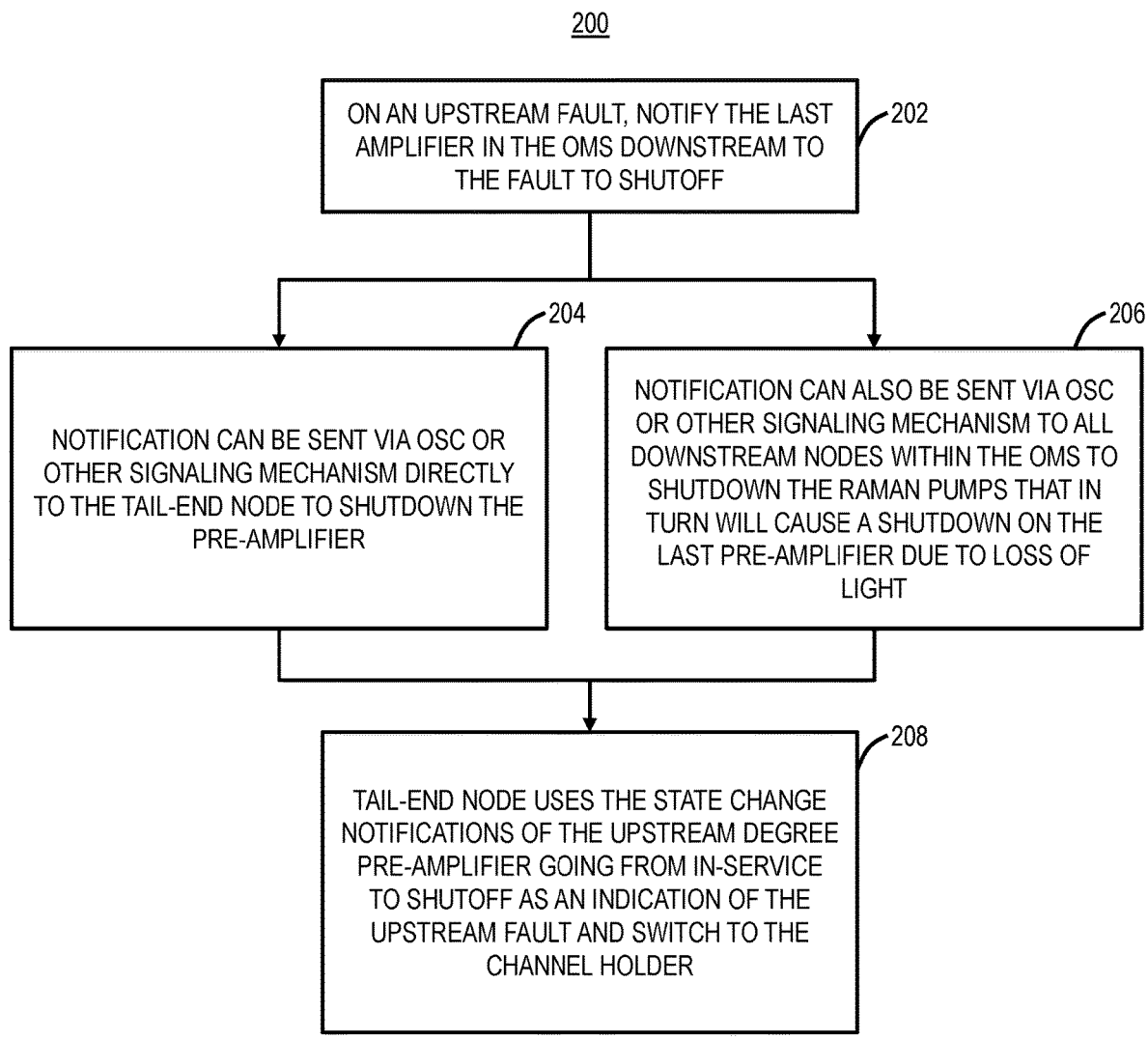
FIG. 15 is a flowchart of a process for optical power replacement in a cascaded optical network with an upstream fault and associated signaling.

FIG. 15 is a flowchart of a process 200 for optical power replacement in a cascaded optical network with an upstream fault and associated signaling. Specifically, the process 200 provides an approach to the additional signaling employed in the embodiment of FIG. 14. Again, this additional signaling is employed as the upstream fault may not be detected as a LOS/LOL at the optical node 12 due to residual ASE or the like.

The process 200 includes, responsive to an upstream fault, notifying the last amplifier in the OMS downstream to the fault to shutoff (step 202). The notification can be sent via an Optical Service Channel (OSC) or another signaling mechanism (such as in-band signaling via overhead, out-of-band such as via a data communications network, etc.) directly to the tail-end optical node 12 to shut down the pre-amplifier (step 204). The notification can also be sent via OSC or other signaling mechanisms to all downstream nodes within the OMS to shut down the Raman pumps, if equipped, that in turn will cause a shutdown on the last pre-amplifier 24 due to loss of light (LOL) (step 206). Note, steps 204, 206 can be performed at or about the same time, including as part of the same messages over the OSC or another signaling mechanism. The tail-end optical node 12 can use the state change notifications of the upstream degree pre-amplifier 24 going from in-service to shutoff as an indication of the upstream fault and switch to the channel holder 20 (step 208).

FIG. 16 is a network diagram of a portion 10B of the optical network 10 illustrating an example of the process 200 for handling an upstream fault in an OMS section 14. In this example, the OMS section 14 is illustrated with two line amplifiers 26 and Raman amplifiers 170. The fault 40 is illustrated to the left of the first line amplifier 26. Thus the fault 40 is two spans downstream from the optical node 12. As described herein, the left-side WSS 22B may not be able to detect the LOS/LOL as the fault 40 is downstream from the optical node 12. Based on the process 200, the first line amplifier 26 is configured to detect the fault 40, shut off its EDFA and the Raman amplifier 170 and send a notification downstream towards the optical node 12. The second line amplifier 26 also receives the notification and shuts off its EDFA and the Raman amplifier 170 and sends the notification downstream towards the optical node 12. The pre-amplifier 24 at the optical node 12 receives the notification and shuts off its EDFA. Accordingly, the left-side WSS 22B detects the LOS/LOL and causes the associated traffic signals 162 to be switched to the channel holders 20.

An automatic recover can occur once the fault 40 is removed, causing the EDFAs and the Raman amplifiers 170 to power up. Once the left-side WSS 22B detects the shut down is clear along with a valid and stable optical power is reported for a duration of time (e.g., 10 s-20 s), the traffic signals 162 can be switched back, instead of the channel holders 20.

Optical Node

In an embodiment, the optical node 12 in the cascaded optical network 10 includes one or more Optical Add/Drop Multiplexer (OADM) devices 22 which each form a respective degree connected to an associated Optical Multiplex Section (OMS) section 14 of the cascaded optical network 10, wherein the cascaded optical network includes a plurality of OMS sections 14; and a channel holder 20 source connected to an OADM device 22, wherein the OADM device 22 is configured to detect a local fault affecting one or more traffic signals 160, 162 through the OADM device 22 and switch to the channel holder 20 source to provide a respective channel holder 20 for each of the one or more traffic signals 160, 162 with a same power level and spectral location such that the respective channel holder 20 replaces a respective traffic signal 160, 162 at the OADM device 22 which is a first switching port after the fault and such that all other OADM devices at other optical nodes downstream from the fault remain switched to the one or more traffic signals 160, 162 due to a presence of the respective channel holder 20.

The OADM device 22 can be further configured to switch back to the one or more traffic signals 160, 162 responsive to (i) detection the fault has recovered and (ii) measured signal power for the one or more traffic signals 160, 162 is stable over a time period. The OADM device 22 can switch back to the one or more traffic signals 160, 162 over a period of time to reduce transients (e.g., only a fraction of spectrum can be switched at a time). The OADM device 22 can detect the local fault if (i) a port associated with the one or more traffic signals 160, 162 reports valid optical power reading and (ii) the port goes from in-service (IS) to a Loss of Signal (LOS) or Loss of Light (LOL). The one or more traffic signals 160, 162 can traverse at least two OMS sections 14 with the OADM device 22 connected to a first OMS section, and wherein a second OMS section does not switch to associated channel holders 20 due to the provided respective channel holder for each of the one or more traffic signals 160, 162 that was lost.

The channel holder 20 source can be an Amplified Stimulated Emission (ASE) source. The local fault can be any of (i) a degree-to-degree fiber cut to the OADM device affecting degree-to-degree connectivity, (ii) a transmitter failure, (iii) a fiber cut between any of the transmitter, a channel multiplexer connected to the transmitter, and the OADM device connected to the channel multiplexer, an intra-node fiber cut at the optical node, and (iv) an upstream fault which has signaling causing optical amplifiers on the associated OMS section to shut down. The local fault can be an upstream fault from the optical node 12 on an associated OMS section 14, and wherein signaling between optical amplifiers 24, 26, 170 causes the optical amplifiers to shut down, leading to the optical node to detect the local fault.

Process of Optical Power Replacement

In another embodiment, a process of optical power replacement for faulted channels in a cascaded optical network includes, at an Optical Add/Drop Multiplexer (OADM) device in an optical node, wherein the OADM device forms a degree which is connected to an associated Optical Multiplex Section (OMS) section of the cascaded optical network, locally detecting a fault affecting one or more traffic signals through the OADM device; and switching the one or more traffic signals to associated channel holders to provide a respective channel holder for each of the one or more traffic signals with a same power level and spectral location such that the respective channel holder replaces a respective traffic signal at the OADM device which is a first switching port after the fault and such that all other OADM devices at other optical nodes downstream from the fault remain switched to the one or more traffic signals due to a presence of the respective channel holder.

The process can further include switching back to the one or more traffic signals responsive to (i) detecting the fault has recovered and (ii) determining measured signal power for the one or more traffic signals is stable over a time period. The switching back can be over a period of time to reduce transients. The locally detecting the fault can be responsive to (i) a port associated with the one or more traffic signals reporting a valid optical power reading and (ii) the port going from in-service (IS) to a Loss of Signal (LOS) or Loss of Light (LOL). The one or more traffic signals can traverse at least two OMS sections with the OADM device connected to a first OMS section, and wherein a second OMS section does not switch to associated channel holders due to the respective channel holder for each of the one or more traffic signals.

The channel holders upstream inserted can be from an Amplified Stimulated Emission (ASE) source. The local fault can be any of (i) a degree-to-degree fiber cut to the OADM device affecting degree-to-degree connectivity, (ii) a transmitter failure, (iii) a fiber cut between any of the transmitter, a channel multiplexer connected to the transmitter, and the OADM device connected to the channel multiplexer, an intra-node fiber cut at the optical node, and (iv) an upstream fault which has signaling causing optical amplifiers on the associated OMS section to shut down. The local fault can be an upstream fault from the optical node on an associated OMS section, and wherein signaling between optical amplifiers causes the optical amplifiers to shut down, leading to the OADM device to detect the local fault.

Cascaded Optical Network

In a further embodiment, a cascaded optical network 10 includes a plurality of optical nodes 12; and a plurality of Optical Multiplex Section (OMS) sections 14 interconnecting the plurality of optical nodes 12; wherein a plurality of traffic signals 160, 162 are configured between the optical nodes 12 over various OMS sections 14, wherein each of the plurality of nodes is configured to detect a local fault affecting one or more traffic signals 160, 162 through an Optical Add/Drop Multiplexer (OADM) device 22, and switch to a channel holder 20 source to provide a respective channel holder 20 for each of the one or more traffic signals 160, 162 with a same power level and spectral location such that the respective channel holder 20 replaces a respective traffic signal at the OADM device 22, wherein the OADM device 22 is a first switching port after the fault and all other OADM devices 22 at other optical nodes 12 downstream from the fault remain switched to the one or more traffic signals 160, 162 due to a presence of the respective channel holder 20.

Each of the plurality of nodes 12 can be further configured to switch back to the one or more traffic signals 160, 162 responsive to (i) detection the fault has recovered and (ii) measured signal power for the one or more traffic signals 160, 162 is stable over a time period. Each of the plurality of nodes 12 can detect the local fault if (i) a port associated with the one or more traffic signals 160, 162 reports valid optical power reading and (ii) the port goes from in-service (IS) to a Loss of Signal (LOS) or Loss of Light (LOL).

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical node in a cascaded optical network comprising:

an Optical Add/Drop Multiplexer (OADM) device which forms a degree connected to an associated Optical Multiplex Section (OMS) of the cascaded optical network, wherein the cascaded optical network includes a plurality of OMSs; and a channel holder source connected to the OADM device, wherein the OADM device is configured to detect a local channel fault affecting one or more traffic signals through the OADM device, switch to the channel holder source to replace a respective channel holder for each of the one or more traffic signals affected by the local channel fault, each respective channel holder replacing a same spectral location such that total power in the OMS remains constant from before the local channel fault was detected to reduce any impact on in-service channels, switch back to the one or more traffic signals responsive to (i) detection that the local channel fault has recovered and (ii) measured signal power for the one or more traffic signals is stable over a time period, wherein the one or more traffic signals are switched back over a period of time by switching a fraction of respective spectrum at a time to minimize transients, wherein the OADM device is a first switching port positioned downstream from the local channel fault such that other OADM devices at other optical nodes downstream from the OADM device remain switched to a respective traffic signal switch port due to a presence of the provided channel holder from the channel holder source, and wherein the channel holder is switched through the respective traffic signal switch port associated with each of the other OADM devices.

2. The optical node of claim 1, wherein the OADM device detects the local channel fault if (i) a port associated with the one or more traffic signals reports valid power reading and (ii) the port goes from in-service (IS) to a Loss of Signal (LOS) or Loss of Light (LOL).

3. The optical node of claim 1, wherein the one or more traffic signals traverse at least two OMS sections with the OADM device connected to a first OMS, and wherein a second OMS does not switch to associated channel holders due to lack of local fiber break detection or due to the respective channel holder presence for each of the one or more traffic signals.

4. The optical node of claim 1, wherein the channel holder source is an Amplified Stimulated Emission (ASE) source.

5. The optical node of claim 1, wherein the local channel fault is one of:
   a degree-to-degree fiber cut to the OADM device affecting degree-to-degree connectivity,
   a transmitter failure,
   a fiber cut between any of the transmitter, a channel multiplexer connected to the transmitter, and the OADM device connected to the channel multiplexer,
   an intra-node fiber cut at the optical node, and
   an upstream fault which has signaling causing optical amplifiers on the associated OMS to shut down.

6. The optical node of claim 1, wherein the local channel fault is an upstream fault from the optical node on an associated OMS, and wherein signaling between optical amplifiers causes the optical amplifiers to shut down within the associated OMS, leading to the optical node to detect the local channel fault.

7. A method of optical power replacement for faulted channels in a cascaded optical network, the method comprising:
   at an Optical Add/Drop Multiplexer (OADM) device in an optical node, wherein the OADM device forms a degree with is connected to an associated Optical Multiplex Section (OMS) of the cascaded optical network, locally detecting a local channel fault affecting one or more traffic signals through the OADM device;
   switching the one or more traffic signals to one or more associated channel holders to provide a respective channel holder for replacing each of the one or more traffic signals affected by the local channel fault, each respective channel holder replacing a same spectral location such that total power in the OMS remains constant from before the local channel fault was detected to reduce any impact on in-service channels;
   switching back to the one or more traffic signals responsive to (i) detecting that the local channel fault has recovered and (ii) determining that measured signal power for the one or more traffic signals is stable over a time period, wherein the switching back is performed over a period of time to minimize transients,
   wherein the OADM device is a first switching port positioned downstream from the local channel fault such that other OADM devices at other optical nodes downstream from the local OADM device remain switched to a respective traffic signal switch port due to a presence of the provided channel holder, and
   wherein the channel holder is switched through the respective traffic signal switch port associated with each of the other OADM devices.

8. The method of claim 7, wherein the locally detecting the local channel fault is responsive to (i) a port associated with the one or more traffic signals reporting a valid power reading and (ii) the port going from in-service (IS) to a Loss of Signal (LOS) or Loss of Light (LOL).

9. The method of claim 7, wherein the one or more traffic signals traverse at least two OMSs with the OADM device connected to a first OMS, and wherein a second OMS does not switch to associated channel holders due to the respective channel holder for each of the one or more traffic signals.

10. The method of claim 7, wherein the channel holders are provided from an Amplified Stimulated Emission (ASE) source.

11. The method of claim 7, wherein the local channel fault is one of:
   a degree-to-degree fiber cut to the OADM device affecting degree-to-degree connectivity,
   a transmitter failure,
   a fiber cut between any of the transmitter, a channel multiplexer connected to the transmitter, and the OADM device connected to the channel multiplexer,
   an intra-node fiber cut at the optical node, and
   an upstream fault which has signaling causing optical amplifiers on the associated OMS to shut down.

12. The method of claim 7, wherein the local channel fault is an upstream fault from the optical node on an associated OMS, and wherein signaling between optical amplifiers causes the optical amplifiers to shut down, leading to the OADM device to detect the local channel fault.

13. A cascaded optical network comprising:
   a plurality of optical nodes; and
   a plurality of Optical Multiplex Sections (OMSs) interconnecting the plurality of optical nodes;
   wherein a plurality of traffic signals are configured between the optical nodes over various OMSs,
   wherein each of the plurality of optical nodes includes an Optical Add/Drop Multiplexer (OADM) device configured to
      detect a local channel fault affecting one or more traffic signals through the respective OADM device,
      switch to a channel holder source to replace a respective channel holder for each of the one or more traffic signals affected by the local channel fault, each respective channel holder replacing a same spectral location such that total power in the OMS remains constant from before the local channel fault to reduce any impact on in-service channels, and
      switch back to the one or more traffic signals responsive to (i) detection that the local channel fault has recovered and (ii) measured signal power for the one or more traffic signals is stable over a time period, wherein the one or more traffic signals are switched back over a period of time by switching a fraction of respective spectrum at a time to minimize transients,
   wherein each OADM device is a first switching port positioned downstream from the local channel fault and other OADM devices at other optical nodes downstream from the respective local OADM device remain switched to a respective traffic signal switch port due to a presence of the provided respective channel holder, and wherein the respective channel holder is switched through the respective traffic signal switch port associated with each of the other OADM devices.

14. The cascaded optical network of claim 13, wherein the respective OADM device of each of the plurality of optical nodes is further configured to switch back to the one or more traffic signals responsive to (i) detection that the local channel fault has recovered and (ii) measured signal power for the one or more traffic signals is stable over a time period.

15. The cascaded optical network of claim 13, wherein the respective OADM device of each of the plurality of optical nodes detects the local channel fault if (i) a port associated with the one or more traffic signals reports valid power reading and (ii) the port goes from in-service (IS) to a Loss of Signal (LOS) or Loss of Light (LOL).

16. The cascaded optical network of claim 13, wherein the local channel fault is one of:
- a degree-to-degree fiber cut to the OADM device affecting degree-to-degree connectivity,
- a transmitter failure,
- a fiber cut between any of the transmitter, a channel multiplexer connected to the transmitter, and the OADM device connected to the channel multiplexer,
- an intra-node fiber cut at the optical node, and
- an upstream fault which has signaling causing optical amplifiers on the associated OMS to shut down.

* * * * *